(12) United States Patent
Kraxner

(10) Patent No.: US 6,341,883 B1
(45) Date of Patent: Jan. 29, 2002

(54) DISPLAY DEVICE FOR AN AUTOMATIC MOTOR VEHICLE TRANSMISSION AND METHOD OF USING SAME

(75) Inventor: Dieter Kraxner, Wurmberg (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 09/568,986

(22) Filed: May 11, 2000

(30) Foreign Application Priority Data

May 11, 1999 (DE) .......................................... 199 21 825

(51) Int. Cl.$^7$ ................................................ B60Q 1/00
(52) U.S. Cl. .................... 362/489; 362/491; 362/29; 340/456; 116/28.1
(58) Field of Search .............................. 362/23, 29, 30, 362/489, 491; 340/456; 116/28.1

(56) References Cited

U.S. PATENT DOCUMENTS

| | | | |
|---|---|---|---|
| 2,751,580 A | * 6/1956 | Stump | ........................ 340/456 |
| 2,879,940 A | * 3/1959 | Cornell | ....................... 116/28.1 |
| 4,821,593 A | 4/1989 | Kobylarz | ...................... 74/475 |
| 4,980,803 A | * 12/1990 | Richmond et al. | ............. 362/23 |
| 5,009,128 A | 4/1991 | Seidel et al. | ................... 74/866 |

FOREIGN PATENT DOCUMENTS

| | | |
|---|---|---|
| DE | 39 03 460 | 11/1989 |
| DE | 38 32 971 | 4/1990 |
| DE | 41 10 075 | 10/1992 |
| EP | 0 361 011 | 4/1990 |

\* cited by examiner

Primary Examiner—Stephen Husar
(74) Attorney, Agent, or Firm—Crowell & Moring LLP

(57) ABSTRACT

A display device for displaying transmission selected speeds and ratios is provided. In order to create a display device in which the space requirement for the display is reduced, it is proposed to use as the display elements the scale elements such as scale numbers or divisional lines of a display instrument. In preferred embodiments, the display instrument is a tachometer.

16 Claims, 1 Drawing Sheet

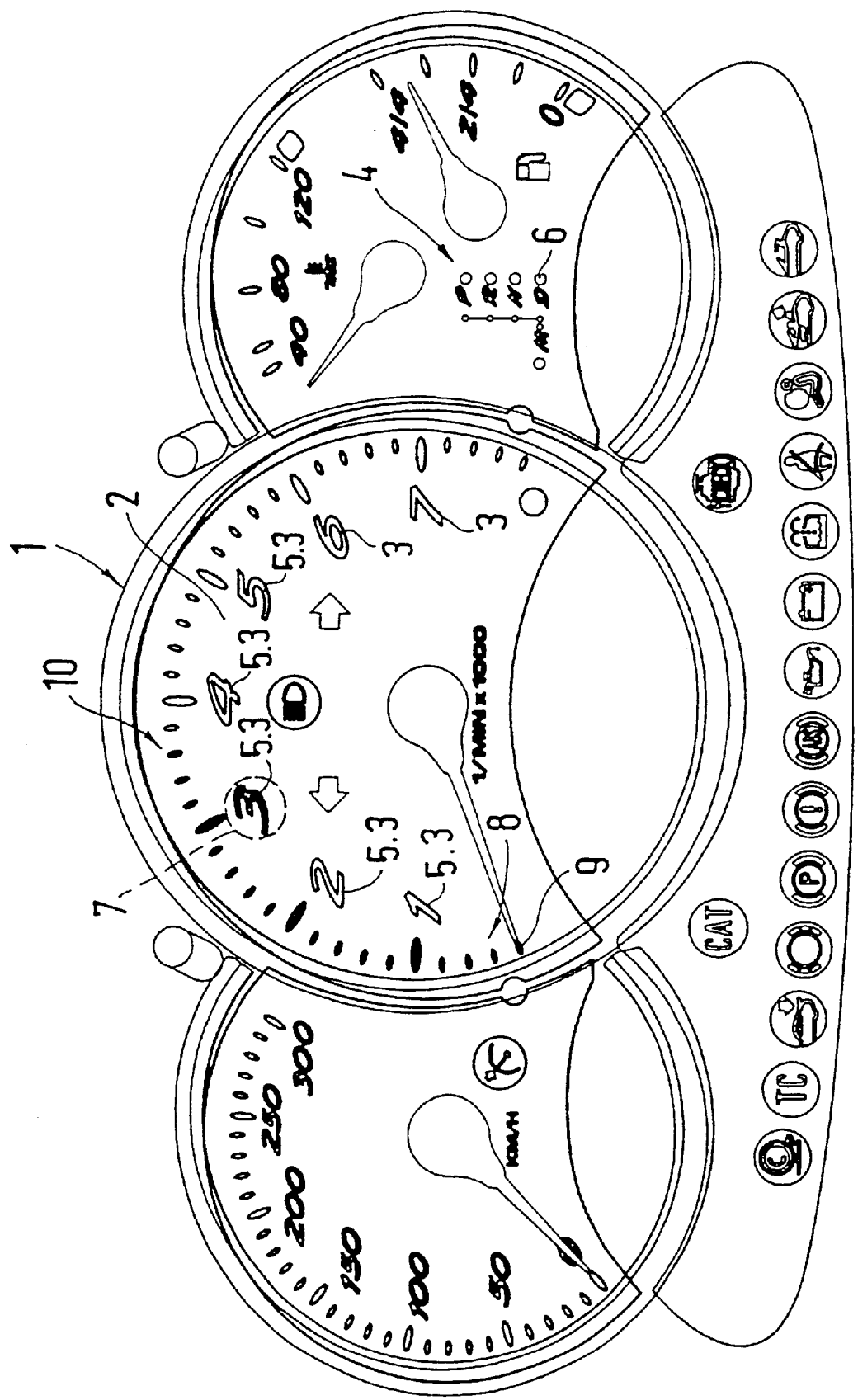

DISPLAY DEVICE FOR AN AUTOMATIC MOTOR VEHICLE TRANSMISSION AND METHOD OF USING SAME

BACKGROUND AND SUMMARY OF THE INVENTION

This application claims the priority of German application 199 21 825.0, filed in Germany on May 11, 1999, the disclosure of which is expressly incorporated by reference herein.

The invention relates to a display device to display selected speeds and ratios.

A display device according to the species is known for example from European Patent Document EP 0 361 011 A1. This display device for an automatic vehicle transmission comprises, in addition to first display elements to display a preselected speed, second display elements. The second display elements, especially in a semiautomatic operating mode of the motor vehicle transmission with manual selection of the speeds, make a speed just engaged visually recognizable. The first and second display elements are advantageously arranged in two parallel vertical rows in a display instrument of the motor vehicle.

The disadvantage of this known display device is that it occupies additional space in the display instrument.

By contrast with this prior art, a goal of the invention is to provide a display device of the above noted type in which the space requirement for the display is reduced.

This goal is achieved according to the invention by providing a display device for a motor vehicle transmission for displaying selected speeds and/or ratios characterized in that scale elements of a display instrument are used as display elements.

According to the invention it is proposed to use as display elements scale elements such as scale numbers or divisions of a display instrument. Since these scale elements are present in any event, the display device requires little if any additional area to display the selected speeds depending on whether all the speeds or gears can be represented by the existing scale numbers.

Advantageous improvements on the invention are described below and in the claims.

Thus, it is proposed to use a tachometer as the display instrument in certain preferred embodiments. The scale numbers of a tachometer are especially suitable as a display element to display speeds since all of the necessary numbers are already present in correct order. In addition, the tachometer as the central display instrument is located mostly in the immediate visual field of the driver so that the selected speeds can be displayed especially clearly. The lines of the scale divisions can be used to display the selected ratio, for example in conjunction with a continuously variable transmission.

As is also proposed according to certain preferred embodiments, the display device can be created by individual scale numbers being provided with transparent illumination for use as display elements. To display the selected speed, the corresponding scale number is illuminated from behind and appears to the driver to be lighter than the other scale numbers not used. In order to make the active display element stand out from the non-active display elements even when the instrument illumination is switched on, it is finally proposed to select a different color than the instrument illumination for the transparent illumination. In this way, the active display element can be distinguished clearly when driving either in the day or at night. In particular, it is also possible to combine the display elements with instrument illumination designed as transparent illumination.

Other advantages, features, and details of the invention will be found in the description below in which a number of embodiments of the invention are described in detail with and the specification may be important to the invention individually or in any combination.

BRIEF DESCRIPTION OF THE DRAWING

The single drawing FIGURE schematically shows an instrument panel including a display constructed according to preferred embodiments of the invention.

DETAILED DESCRIPTION OF THE DRAWING

The single FIGURE shows a tachometer 1 as is generally known to be used in motor vehicles. Tachometer 1 shown here has a display range from 0 to more than 7000 rpm. Accordingly, in display 2 scale numbers 3 appear from the number "0" to the number "7." In a display field 4 shown separately here, the known speeds P, R, N, D are shown. The drawing shows how these driving ranges can be selected or engaged with the aid of a selector lever, not shown. Luminous diodes 6 are used to display the selected speed; alternatively the symbols of the first display field can also be illuminated using transparent illumination so that only the currently selected speed represented by the symbol is illuminated. As an additional symbol, the symbol M is provided in the first display field 4 showing a manual operating mode for the not shown transmission.

In non-automated vehicle transmissions, the first display field 4 is provided to display the speed "IN"=neutral and "R"=reverse or the first display field 4 is not provided or activated.

Selected scale numbers 5.3 display the values 1, 2, 3, 4, and 5 and are selected to correspond to the speeds 1 to 5 provided in the transmission. In a 6-speed transmission, scale number "6" would be selected as a special scale number 5.3, etc. Display field 4 as well as the selected scale numbers 5.3 together form a display device for the transmission.

By means of a transparent illumination device known of itself, the selected scale numbers 5.3 are lit from behind using transparent illumination; the active scale number 5.3 in each case appears brighter or in a different color than the other scale numbers 3, 5.3.

To increase the visibility of the display, provision is made in the present example to display the selected scale numbers negatively, in other words as black numbers on an illuminated background. To do this, the scale numbers 3, 5.3 are printed in white paint not permeable to light on dial 2 while the dial 2, light gray in color for example, is permeable to light. The light spot 7 produced by the light source, not shown, is circular so that with an active display element and the light source switched on, the corresponding scale number appears as a dark shadow against the bright light spot.

When driving at night, dial 2 is lit from behind so that all the scale numbers 3, 5.3 stand out as dark shadows against the uniformly illuminated dial 2. In order to permit clear legibility under these conditions as well, the color of light spot 7 is markedly different (red for example) by contrast with the color of the background illumination, blue for example.

The display device is suitable for use in conjunction with an automatic or automated vehicle transmission as well as in a manually operated transmission.

When used with a continuously variable transmission, provision can additionally be made such that a scale division 8 is used to display the currently engaged transmission ratio. For this purpose, division line 9 on scale division 8 can be illuminated in the same way as scale numbers 5. The division line 9 can be controlled as a point of light or as shown in the single figure, as a band of light 10. In the example provided, illuminated band 10 extends to a point between scale numbers 5 with values "3" and "4" indicating that the ratio currently set with the transmission is located between a ratio for a third gear and a ratio for a fourth gear. Even in a continuously variable transmission, it is advisable according to the invention to use the scale numbers 5 to display selected ratios when it is equipped with a control that simulates a multispeed transmission.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Display device for a motor vehicle transmission for displaying selected speeds and/or ratios, wherein existing scale elements of a display instrument for other purposes are used as display elements for the display of the selected speeds or ratios.

2. Display device according to claim 1, wherein the display instrument is a tachometer.

3. Display device according to claim 1, wherein the scale elements are scale numbers.

4. Display device according to claim 2, wherein the scale elements are scale numbers.

5. Display device according to claim 1, wherein the scale elements are divisional lines.

6. Display device according to claim 2, wherein the scale elements are divisional lines.

7. Display device according to claim 1, wherein the scale elements are provided with transparent illumination for use as display elements.

8. Display device according to claim 2, wherein the scale elements are provided with transparent illumination for use as display elements.

9. Display device according to claim 3, wherein the scale elements are provided with transparent illumination for use as display elements.

10. Display device according to claim 5, wherein the scale elements are provided with transparent illumination for use as display elements.

11. Display device according to claim 7, wherein the transparent illumination has a different color than the instrument illumination.

12. Display device according to claim 8, wherein the transparent illumination has a different color than the instrument illumination.

13. Display device according to claim 9, wherein the transparent illumination has a different color than the instrument illumination.

14. Display device according to claim 10, wherein the transparent illumination has a different color than the instrument illumination.

15. A method of displaying motor vehicle transmission selected speeds and/or ratios, comprising using existing scale elements of a vehicle display instrument for also displaying in the vehicle transmission speeds and/or ratios.

16. A method according to claim 15, wherein the display instrument is a tachometer.

\* \* \* \* \*